(12) United States Patent
May

(10) Patent No.: US 6,220,467 B1
(45) Date of Patent: Apr. 24, 2001

(54) VEHICLE EXTENSION CRATE

(76) Inventor: Robert M. May, 120 Empire Dr., Gahanna, OH (US) 43230

( * ) Notice: Subject to any disclaimer, the term of this patent is extended or adjusted under 35 U.S.C. 154(b) by 0 days.

(21) Appl. No.: 09/159,283

(22) Filed: Sep. 23, 1998

(51) Int. Cl.[7] .................................................. B65D 8/00
(52) U.S. Cl. .............................. 220/1.5; 220/4.03; 220/6; 220/4.33
(58) Field of Search ................................ 220/4.33, 4.34, 220/4.03, 1.5

(56) References Cited

U.S. PATENT DOCUMENTS

| 4,000,827 | * | 1/1977 | Emery | 220/4.33 |
|---|---|---|---|---|
| 5,381,915 | * | 1/1995 | Yardley | 220/4.33 |
| 5,638,973 | * | 6/1997 | Dewey et al. | 220/4.33 |

FOREIGN PATENT DOCUMENTS

| 4210435A1 | * | 7/1993 | (DE) | 220/4.33 |
|---|---|---|---|---|
| 0622911 | * | 7/1961 | (IT) | 220/4.34 |

* cited by examiner

Primary Examiner—Joseph M. Moy
(74) Attorney, Agent, or Firm—Thomas S. Baker, Jr.

(57) ABSTRACT

A vehicle extension crate assembly for mounting at the rear of a cargo transport vehicle is provided with inter-connected bottom, back, side, top, and front lipped panels that are readily assembled into a rigid unitary structure with included overflow cargo.

3 Claims, 3 Drawing Sheets

VEHICLE EXTENSION CRATE

CROSS-REFERENCES

None.

FIELD OF THE INVENTION

This invention relates generally to cargo transport vehicles such as vans and trailers commonly utilized for moving household furnishings, and particularly concerns a extension crate construction and method of mounting and assembly which may be utilized in combination with a cargo transport vehicle to readily and conveniently increase the vehicle cargo-carrying capacity.

BACKGROUND OF THE INVENTION

Frequently the operators of conventional household goods moving vans or trailers encounter loading situations in which the bulk of a load to be moved in one trip exceeds the bulk carrying capacity of the vehicle. Prior to the making of the present invention no known readily assembled, disassembled, and stowed extension crate equipment has been proposed or made available for conveniently and readily temporarily increasing the cargo-carrying capacity of such moving vans.

SUMMARY OF THE INVENTION

The vehicle extension crate of the present invention is basically comprised of a bottom or base panel having a pair of fork lift transverse fork tine recesses and a pair of side slotted anchor rails, of a foldable back panel removably joined to the base panel, of a pair of side panels removably joined to the base and back panels and each having a side slotted anchor rail, a top panel removably joined to the side and back panels, and a front panel removably joined to the base, side, and top panels. A pair of adjustable load straps co-operate with slotted anchor rails mounted on the vehicle body and with the base panel fork lift transverse fork tine recesses. Two additional pairs of adjustable load straps co-operate with the vehicle body slotted anchor rails and with the side panel side slotted anchor rails.

The components of the novel vehicle extension crate, following disassembly, are normally stowed in a stowage chamber included in the vehicle and accessible from the vehicle exterior.

DETAILED DESCRIPTION

Figure 1:
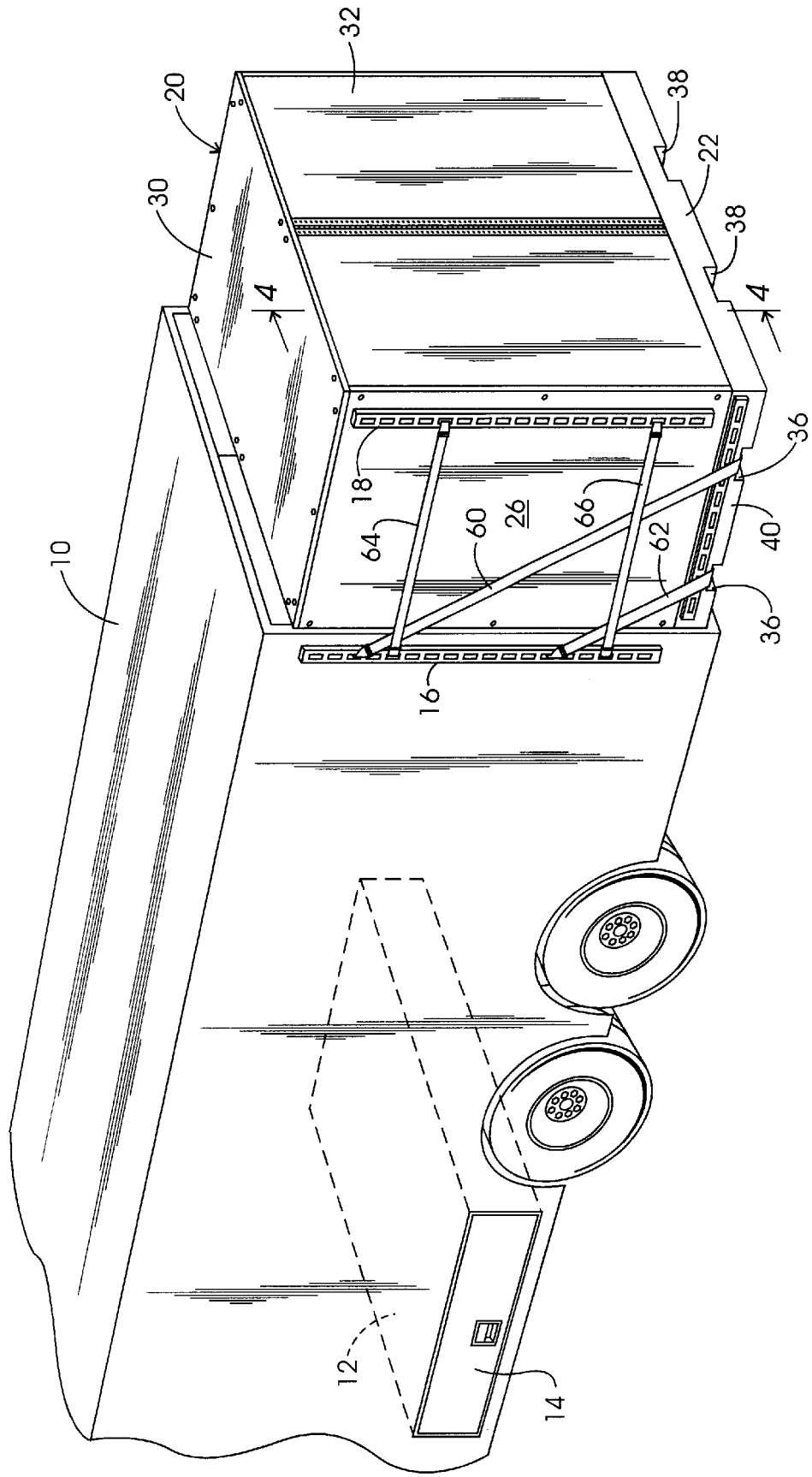
FIG. 1 is a perspective partial view of a conventional household goods moving van vehicle having a preferred embodiment of the vehicle extension crate of the present invention mounted thereon.

FIG. 1 illustrates a portion of a representative van-type household goods cargo transport vehicle 10 having a conventional underside stowage chamber 12 that is accessible through a vehicle exterior door 14. Vehicle 10 is also provided, adjacent the vehicle rear, with a vertical side slotted anchor rail element 16 on each vehicle side, one of which is seen in FIG. 1. An assembled vehicle extension crate 20, constructed in accordance with the present invention, is anchored at the rear of cargo transport vehicle 10 by means of the included pair of vehicle vertical side slotted anchor rail elements 16, the crate vertical side slotted rail elements 18, and co-operating conventional adjustable-length, flexible load straps.

Figure 2:
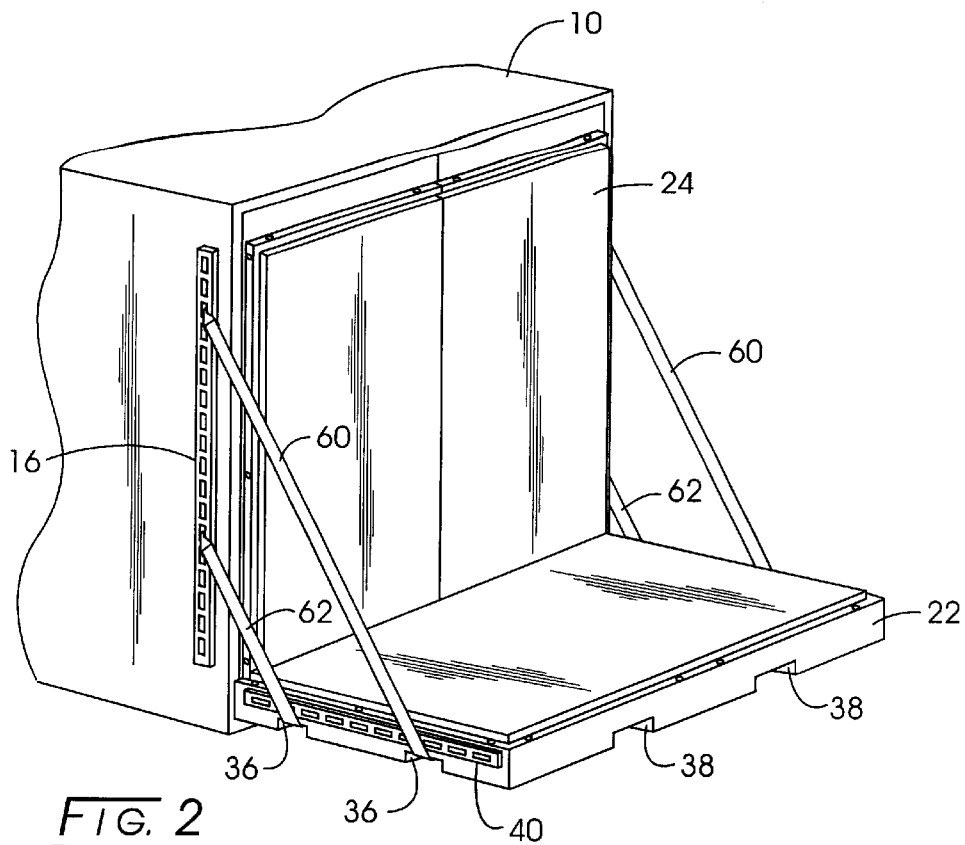
FIGS. 2 and 3 illustrate the vehicle extension crate of FIG. 1 at different intermediate stages of assembly.
Figure 3:
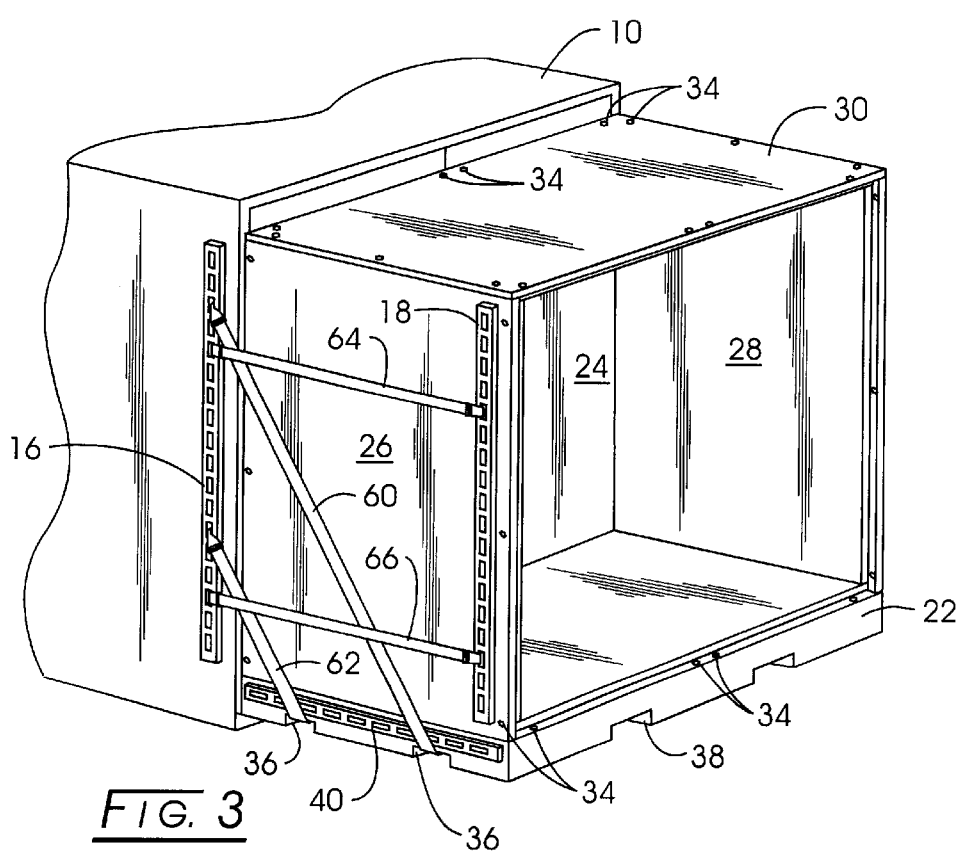

The principal components of vehicle extension crate assembly 20 include a base or bottom panel 22, a foldable two piece back panel 24 (see FIGS. 2 and 3), a pair of side panels 26 and 28, a top panel 30, and a foldable two piece front panel 32 (see FIG. 1). The two piece foldable back and front panels 24 and 32 are formed of substantially equal sized pairs of panels connected by hinges along a vertical axis. Each panel comprising the crate assembly is preferably formed by blow molding a suitable polymeric resin such as polyethylene resin, has overall dimensions which permit storage of the panel following crate disassembly in vehicle storage chamber 12, and is provided with integral internal construction features which facilitate subsequent joining the panels into a unitary structure using threaded bolt fasteners 34.

Bottom panel 22 is blow molded with integral transverse fork-lift fork tine recesses 36 and with integral longitudinal fork-lift fork tine recesses 38. The transverse recesses 36 are utilized in the mounting of vehicle extension crate 20 at the rear of cargo transport vehicle 10. Also, each side of bottom panel 22 may be provided with an optional side slotted anchor rail 40.

Figure 4:
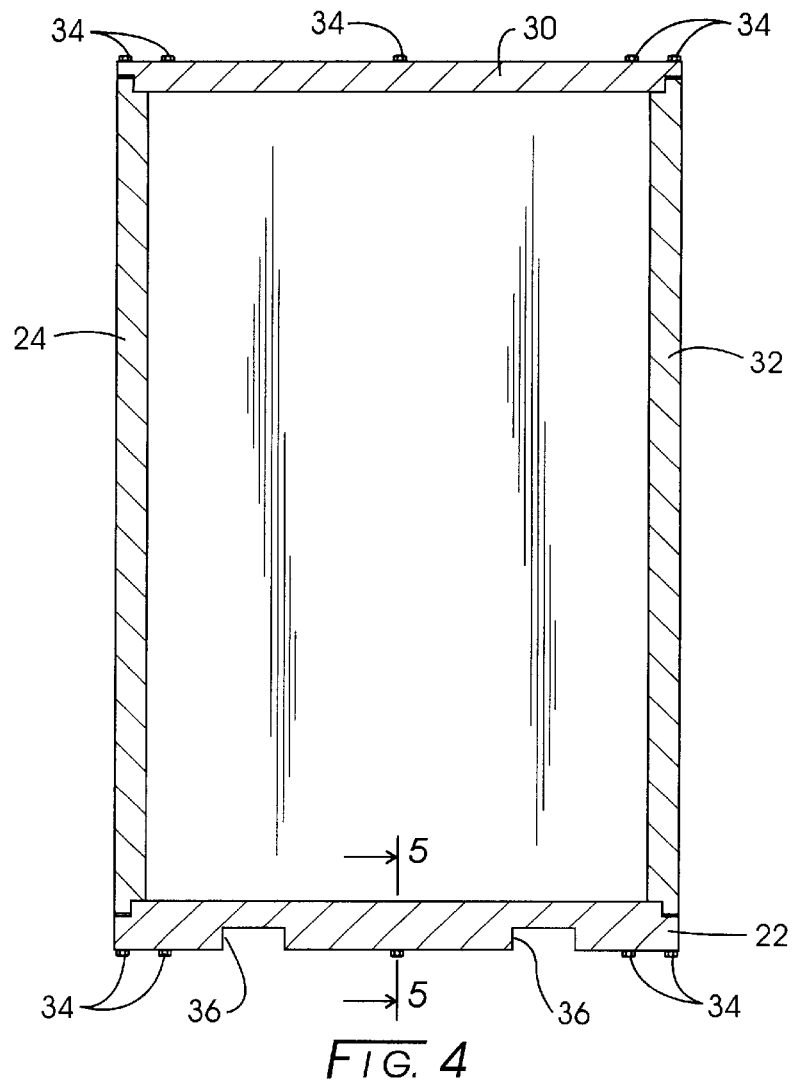
FIG. 4 is a section view taken at line 4—4 of FIG. 1.
Figure 5:
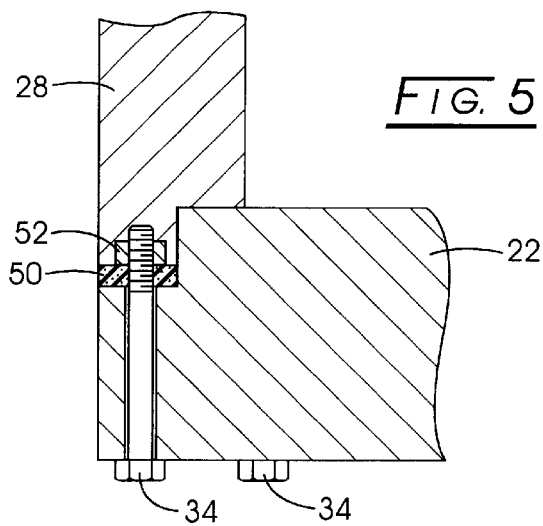
FIG. 5 is a partial section view taken at line 5—5 of FIG. 4 to illustrate a weather-sealed panel fastening detail preferably utilized throughout the FIG. 1 vehicle extension crate.

Note should be taken from the drawings (see FIGS. 4 and 5, for instance) that each crate panel is provided with a lipped perimeter and that upon joinder using fasteners 34 the panel perimeter lips complement each other. Also, and as illustrated in FIG. 5, it is preferred that a resilient, moisture-impervious gasket 50 is positioned intermediate each adjacent abutting panel prior to installation of co-operating fasteners 34. Also as suggested by FIG. 5, each fastener 34 preferably engages a respective threaded nut device 52 that is integrally molded into the vehicle extension crate assembly panel components and after being inserted through the properly positioned bore 54 that is integrally fastened into the complementary panel lip.

In addition to fasteners 34, the invention utilizes two pairs of conventional adjustable-length load strap elements, preferably fabricated with anchor fitting ends joined by nylon polymer webbing, a polypropylene webbing, or the like to effectively secure the assembled and loaded extension crate to cargo transport vehicle 10. The conventional strap anchor fitting ends co-operate with the slots in the slotted anchor rail elements 16 and 18.

The pair of adjustable-length load straps referenced as 60 and 62 are preferably arranged to be anchored at each end to a vehicle vertical slotted anchor rail element 16 and to co-operate with a respective one of transverse fork-lift fork tine recesses 36 in bottom panel element 22. The pair of adjustable-length load strap elements designated 64 and 66 are anchored at either end to a vehicle vertical slotted anchor rail element 16 and to a respective crate vertical slotted anchor rail elements 18.

The basic steps preferred for assembling vehicle extension crate 20 at the rear of cargo transport vehicle 10 involve first securing load strap 62 to an anchor rail 16 and pass it through the crate rear transverse fork tine recess 36 of bottom panel 22, finally securing the other strap end to the anchor rail 16 provided on the opposite side of vehicle 10. A like sequence is utilized with adjustable-length load strap 60 passing through the crate front transverse fork tine recess 36. The lengths of the installed load straps are finally adjusted to assure that bottom panel 22 is level and clears the vehicle's tail-lights.

Next back panel 24 is properly located on bottom panel 22 and secured in position by its threaded fasteners 34. Subsequently, side panel elements 26 and 28 are located on bottom panel 22 and properly bolted to bottom panel 22 and to the vertical edges of back panel 24 by the required threaded fasteners 34. Thereafter top panel 30 is properly positioned on top of back panel 24 and side panels 26 and 28 and secured by fasteners 34 to those vertical panels.

Afterwards the interior of the so-assembled partial crate is loaded with the overflow volume of cargo to be transported, and folded front panel 32 is opened, properly positioned on bottom panel 22, and joined to bottom panel 22, side panels 26 and 28, and top panel 30 by the required fasteners 34. Lastly, each load strap pair 64, 66 at the crate sides is appropriately anchored to vehicle vertical anchor rails 16 and to crate vertical anchor rails 18 and adjusted for tautness.

Unloading of the cargo contents of vehicle extension crate 20 and its disassembly and stowage is accomplished in a reverse manner.

Various changes may be made in the shape, size, and materials of construction of the components of vehicle extension crate 20 without departing from the scope, meaning, or intent of the claims which follow.

I claim as my invention:

1. A vehicle extension crate, for mounting and assembly at the rear of a cargo transport vehicle, comprising:

a rectangular bottom panel that is molded of a polymeric resin and that has lipped edges;

a readily foldable rectangular back panel that is molded of a polymeric resin and that has lipped edges that co-operate with said bottom panel lipped edges;

a pair of rectangular side panels that are each molded of a polymeric resin and that each have edges that co-operate with said bottom panel lipped edges and with said back panel lipped edges;

a rectangular top panel that is molded of a polymeric resin and that has lipped edges that co-operate with said back panel lipped edges and with said side panel lipped edges;

a readily foldable front panel that is molded of a polymeric resin and that has lipped edges that co-operate with said bottom panel lipped edges, with said pair of side panels lipped edges, and with said top panel lipped edges;

threaded fastener means joining said bottom panel, said back panel, said pair of side panels, said top panel, and said front panel into a rigid unitary structure;

wherein said rectangular bottom panel further comprises transverse bottom recesses for receiving the tines of a fork-lift; and first readily-removable, adjustable-length load strap means tautly co-operating with said bottom panel transverse recesses and mounting the vehicle extension crate assembly on the cargo transport vehicle.

2. The vehicle extension crate assembly of claim 1 further comprising:

second readily-removable, adjustable-length load strap means tautly co-operating with said pair of side panels and mounting the vehicle extension crate assembly on the cargo transport vehicle.

3. In a method of assembling a vehicle extension crate mounted upon the rear of a cargo transport vehicle, the steps of:

positioning a rectangular bottom panel having lipped edges and underside recesses for receiving the tines of a fork-lift at the rear of the cargo transport vehicle;

securing first readily-removable, adjustable-length load strap means to the cargo transport vehicle and in co-operating relation to said bottom panel transverse recesses;

joining a foldable, rectangular back panel having lipped edges to said bottom panel and in co-operation with said bottom panel lipped edges;

joining a pair of rectangular side panels each having lipped edges to said bottom panel and to said back panel, and in co-operation with said bottom panel lipped edges and said back panel lipped edges;

joining a rectangular top panel having lipped edges to said back panel and to said pair of side panels, and in co-operation with said back panel lipped edges and said pair of side panel lipped edges;

loading cargo interiorly of said joined bottom panel, back panel, pair of side panels, and top panel;

joining a readily foldable, rectangular front panel having lipped edges to said bottom panel, to said pair of side panels, and to said top panel, and in co-operation with said bottom panel lipped edges, said pair of side panel lipped edges, and said top panel lipped edges; and tautly securing a second readily-removable, adjustable-length load strap means to the cargo transport vehicle and to said pair of side panels.

* * * * *